(12) United States Patent
Petit-Huguenin (10) Patent No.: US 9,762,633 B1
(45) Date of Patent: *Sep. 12, 2017

(54) SYSTEMS AND METHODS FOR DISTRIBUTED CONFERENCING

(71) Applicant: 8x8, Inc., San Jose, CA (US)

(72) Inventor: Marc Petit-Huguenin, Saratoga, CA (US)

(73) Assignee: 8×8, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,335

(22) Filed: May 4, 2016

Related U.S. Application Data (63) Continuation of application No. 13/926,385, filed on Jun. 25, 2013, now Pat. No. 9,338,221, which is a continuation of application No. 12/618,113, filed on Nov. 13, 2009, now Pat. No. 8,498,725.

(60) Provisional application No. 61/114,734, filed on Nov. 14, 2008.

(51) Int. Cl.
| | |
|---|---|
| *G06F 17/00* | (2006.01) |
| *H04L 29/06* | (2006.01) |
| *H04L 12/761* | (2013.01) |
| *H04L 12/28* | (2006.01) |
| *H04L 29/08* | (2006.01) |

(52) U.S. Cl.
CPC ...... *H04L 65/4053* (2013.01); *H04L 12/2854* (2013.01); *H04L 45/16* (2013.01); *H04L 67/10* (2013.01)

(58) Field of Classification Search
CPC ... H04L 65/403; H04L 12/185; H04L 63/126; H04M 3/567; H04M 3/568; H04M 2203/205; H04M 2203/5063; H04N 7/15; H04N 21/6405

See application file for complete search history.

(56) References Cited

U.S. PATENT DOCUMENTS

| | | | |
|---|---|---|---|
| 4,837,798 | A | 6/1989 | Cohen et al. |
| 5,379,351 | A | 1/1995 | Fandrianto et al. |
| 5,410,326 | A | 4/1995 | Goldstein |
| 5,574,964 | A | 11/1996 | Hamlin |
| 5,722,041 | A | 2/1998 | Freadman |
| 5,835,126 | A | 11/1998 | Lewis |
| 5,905,942 | A | 5/1999 | Stoel et al. |
| 6,104,334 | A | 8/2000 | Allport |
| 6,108,687 | A | 8/2000 | Craig |
| 6,202,084 | B1 | 3/2001 | Kumar et al. |
| 6,259,701 | B1 | 7/2001 | Shur et al. |
| 6,275,574 | B1 | 8/2001 | Oran |

(Continued)

*Primary Examiner* — Thomas Maung
(74) *Attorney, Agent, or Firm* — Crawford Maunu PLLC (57) ABSTRACT

Distributed conferencing systems and methods provide local meeting contents to remote participants. In accordance with various example embodiments, a plurality of authorized source units generate media content responsive to and representative of respective content for a meeting. In response to the generated media content, one or more data streams are developed at each authorized source, each stream being a separately-decodable real-time representation of at least a portion of the media content generated at the respective authorized source. The separate data streams are transmitted by each authorized source to a common multicast IP group address for retrieval/access by remote participants.

20 Claims, 5 Drawing Sheets

(56) References Cited

U.S. PATENT DOCUMENTS

| | | |
|---|---|---|
| 6,343,313 B1 | 1/2002 | Salesky et al. |
| 6,441,842 B1 | 8/2002 | Fandrianto et al. |
| 6,487,585 B1 | 11/2002 | Yurkovic |
| 6,526,581 B1 | 2/2003 | Edson |
| 6,611,537 B1 | 8/2003 | Edens et al. |
| 6,636,594 B1 | 10/2003 | Oran |
| 7,065,709 B2 | 6/2006 | Ellis et al. |
| 7,079,495 B1 | 7/2006 | Pearce et al. |
| 7,103,667 B1 * | 9/2006 | Bell .............. H04L 12/1818 709/227 |
| 7,203,755 B2 | 4/2007 | Zhu et al. |
| 7,296,091 B1 | 11/2007 | Dutta et al. |
| 7,379,968 B2 | 5/2008 | Schuh |
| 7,394,803 B1 | 7/2008 | Petit-Huguenin et al. |
| 7,417,989 B1 | 8/2008 | Doran |
| 7,742,758 B2 | 6/2010 | Guccione |
| 7,844,670 B2 | 11/2010 | Roskowski et al. |
| 7,877,266 B2 | 1/2011 | Brydon et al. |
| 8,060,558 B2 | 11/2011 | Chang |
| 8,098,807 B2 | 1/2012 | Charish |
| 8,194,116 B2 | 6/2012 | Cook |
| 2002/0054601 A1 | 5/2002 | Barraclough et al. |
| 2002/0067405 A1 | 6/2002 | McDiarmid |
| 2003/0012385 A1 | 1/2003 | Saito |
| 2003/0063615 A1 | 4/2003 | Luoma et al. |
| 2003/0112947 A1 | 6/2003 | Cohen |
| 2004/0078825 A1 | 4/2004 | Murphy |
| 2004/0263636 A1 * | 12/2004 | Cutler .................. H04N 7/15 348/211.12 |
| 2005/0021833 A1 | 1/2005 | Hundscheid et al. |
| 2005/0044503 A1 | 2/2005 | Richardson et al. |
| 2005/0052338 A1 | 3/2005 | Suzuki et al. |
| 2007/0019645 A1 | 1/2007 | Menon |
| 2007/0088703 A1 | 4/2007 | Kasiolas et al. |
| 2007/0211722 A1 | 9/2007 | Subramanian |
| 2007/0239825 A1 | 10/2007 | Walter |
| 2007/0294263 A1 | 12/2007 | Punj et al. |
| 2010/0125353 A1 | 5/2010 | Petit-Huguenin |

* cited by examiner

SYSTEMS AND METHODS FOR DISTRIBUTED CONFERENCING

RELATED PATENT DOCUMENTS

This patent document is a continuation under 35 U.S.C. §120 of U.S. patent application Ser. No. 13/926,385 filed on Jun. 25, 2013 (U.S. Pat. No. 9,338,221); which is a continuation of U.S. patent application Ser. No. 12/618,113 filed on Nov. 13, 2009 (U.S. Pat. No. 8,498,725), which claims the benefit, under 35 U.S.C. §119(e), of U.S. Provisional Patent Application Ser. No. 61/114,734 filed on Nov. 14, 2008, and entitled "Systems and Methods for Distributed Conferencing;" each of these patent documents is fully incorporated herein by reference.

FIELD OF THE INVENTION

The present invention relates generally to systems and methods for providing conference meeting contents to remote participants in a distributed manner.

BACKGROUND

Many collaborative groups and associations rely on holding conferences to advance their work and disseminate information. While attending a conference meeting in person allows the attendee to experience and participate in the meeting as intended, remote participants (e.g., attending over the Internet) often are subjected to a much lower quality experience due to pre-distribution of older versions of presentation slides, poor audio quality, transmission interruptions due to server crashes, and so forth. These factors diminish the ability for remote participants to attend the meeting in real time in any meaningful way. In current systems for distributing "live" conference meeting contents to remote participants, the contents are gathered and managed by a central server. As such, any problem experienced by the server affects all of the meeting contents routed through the server. For instance, server-related disruptions such as a server crash will affect all of the content provided to that server.

Multicast distribution allows for one-to-many communication without requiring prior knowledge of the receivers. However, multicast distribution does not require prior knowledge of the senders, which can lead to confusion regarding origination, particularly when there are multiple (or an undetermined number) of possible senders. Briefly, multicast uses network infrastructure efficiently by requiring the source to send a packet only once, even if it needs to be delivered to a large number of receivers. The nodes in the network take care of replicating the packet to reach multiple receivers only where necessary. A multicast group IP address is used by sources and the receivers to send and receive content. Sources use the multicast group IP address as the destination address in their data packets. Receivers use this multicast group IP address to inform the network that they are interested in receiving packets sent to that group.

In certain conferencing approaches, the contents delivered to remote participants are gathered into three groups, namely the audio stream for the session, the presentation slides, and the notes and comments developed by scribes (referred to as "jabber"). These three groups of meeting contents are managed differently by different people, and as such preparations are made before the meeting to ensure that all contents are properly delivered. For example, the audio stream may be managed through a centralized server, separate from the servers through which the presentation slides and jabber content are routed. Each of these servers may be prone to crashing, resulting in disruption of all the content provided by that server. While interruption of the presentation slides may be mitigated by distributing a copy of the slides ahead of the meeting, the slide contents are often being revised up to the time of the meeting, and thus the remote participants cannot always rely on materials provided prior to the meeting.

These and other issues remain challenging to multicast-type and other conferencing approaches.

SUMMARY

Aspects of the present invention are directed to conferencing systems and methods in which locally-generated conference meeting contents are provided in real time to remotely-located participants, for example via multicast broadcasting without the use of a centralized server. These and other aspects of the present invention are exemplified in a number of implementations and applications, some of which are shown in the figures and characterized in the claims that follow.

According to an example embodiment, the present invention is directed to distributed conferencing systems and methods to provide local meeting contents to remote participants. A plurality of authorized source units are used to generate media content responsive to and representative of respective portions of the meeting contents, and in response to the generated media content, to develop one or more data streams. Each of these data streams represent separately-decodable real time representation of at least a portion of the media content generated at the respective authorized source. The separate data streams are transmitted by the authorized source units to the same multicast IP group address for retrieval by remote participants.

According to a specific embodiment of the present invention, local meeting contents are distributed to remote participants from a plurality of authorized source units, with each source unit having a respective source unit IP address. A meeting announcement is transmitted to an announcement multicast IP address, such as by specifying an IP address for each authorized source unit, date and time information for the meeting and/or a meeting multicast group IP address. Each of the plurality of authorized sources is used to search the meeting announcement data and to generate media content responsive to and representative of respective portions of the meeting contents, according to the date and time information for the meeting retrieved from the meeting announcement. In response to the generated media content, one or more data streams are developed, each stream being a separately-decodable real-time representation of at least a portion of the media content generated at the respective authorized source unit. The data streams are transmitted from the authorized source units to the meeting multicast group IP address retrieved from the meeting announcement.

Consistent with another example embodiment of the present invention, local meeting contents are distributed from a plurality of source units to remote participants in a conferencing system. Logic circuitry at each of the plurality of source units carries out the respective steps for the source units, which include generating media content at each of the plurality of source units in response to and representative of respective portions of the meeting contents, and developing one or more data streams at each of the plurality of source units in response to the generated media content. Each data stream is developed as a separately-decodable real time representation of at least a portion of the media content generated at the respective source unit, and transmitting each of the data streams from the one or more source units to the same multicast IP address.

According to an embodiment of the present invention, a distributed conferencing system for providing local meeting contents to remote participants includes an announcement unit and a plurality of source units. The announcement unit is configured for periodically transmitting a meeting announcement to an announcement multicast IP address, where the meeting announcement specifies an IP address for a plurality of authorized source units, date and time information for the meeting, and a meeting multicast group IP address. Each of the source units searches the announcement multicast IP address for the meeting announcement containing the IP address of the respective authorized source unit, and retrieves the meeting multicast group IP address and date and time information for the meeting from the meeting announcement. In accordance with the date and time information for the meeting retrieved from the meeting announcement, the source units each generate media content responsive to and representative of respective portions of the meeting contents, and in response to the generated media content, develop one or more data streams. Each of the data streams is a separately decodable real time representation of at least a portion of the media content generated at the respective authorized source unit. The source units transmit the one or more data streams to the meeting multicast group IP address retrieved from the meeting announcement.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to conferencing systems and methods in which locally-generated conference meeting contents are provided in real time to remotely-located participants, for example via multicast broadcasting without the use of a centralized server. While the present invention is not necessarily limited to such applications, various aspects of the invention may be appreciated through a discussion of various examples using this context.

Aspects of the present invention involve simultaneous multicasting of individual data streams that represent various portions of a conference meeting contents to a common multicast IP address. As used in this document, it will be appreciated that the term IP applies to current and future versions of IP, including IPv4 multicast and IPv6 multicast, and that aspects of the invention apply to all of these. All streams for one meeting (or conference room) are sent to a single multicast IP address. Remote participants who want to follow the meeting contents in real time can join the multicast group associated with the IP address. In certain embodiments, the multicast streams are encrypted to limit access to authorized users.

The data streams are developed from respective portions of the meeting contents generated at one or more source units, which are equipped to provide the data streams as separately-decodable real-time representations of the portion of the meeting content generated at the respective source unit. These data streams are individually, directly and simultaneously transmitted to the same multicast IP address. Such transmission accommodates the dropping and adding of individual data streams without affecting the other data streams.

In accordance with certain embodiments, only authorized data streams are routed to each receiver. This approach can be used, for example, to mitigate problems that may arise with open access multicast applications, where anybody on a particular network (e.g., the Internet) can access the multicast. In one implementation, user authorization is controlled using an announcement that can be accessed by each potential receiver, the announcement including a list of source unit IP addresses that are part of the conference, such as a list of IP addresses for microphones in a conference room along with a slide presentation and other content sources. The delivery of this announcement can thus be used to control the multicast conference participation. When a particular remote participant joins the multicast group for the conference, the remote participant provides the list of source IP addresses received in the announcement so that only those data streams originating from the identified sources are received. Accordingly, the announcements can be used not only to control access to the conference as a whole, but can also control the type of access that each user has. For example, where certain content is restricted or not desired, that content can be restricted. One such approach may involve a conference in which some participants are to share proprietary data, whereas other participants are not to share the data (e.g., a legal or contractual conference). Another such approach may involve a multilingual conference, in which different participants receive only content pertaining to a selected language that the participant can understand. Still another approach involves tailoring content for a participant's end device, such as by providing rich media content to robust devices while providing a lower-bandwidth version of the content to less robust devices, such as a mobile device.

As discussed in more detail below, an announcement as discussed above may also be used to automatically configure the source units. For example, when a source unit is activated, it searches the various meeting announcements for its own IP address to discover certain information about the meeting to which the announcement pertains, including the multicast IP address for data transmission, meeting time and duration, and so forth.

In a generalized conference meeting environment, and as may be applicable to various embodiments, the conference is divided into various sessions or working groups for which meetings take place in different conference rooms and often at the same time. Each conference room session may be managed by a person chairing the group. In addition to a presenter, there may also be people taking notes for the minutes. The chair's function is to present the agenda and the status of the group at the beginning of the session, to introduce presenters, and to moderate question and answer sessions. The presenter gives a slide-based presentation, which is displayed on a screen using a projector. There may also be one or more microphones on stands distributed in the room for audience members to add comments or ask questions.

In various embodiments, an end-to-end principle is used to provide meeting contents in independent data streams using a single multicast IP address. This allows the meeting contents to be broadcast for receipt by remote participants without the use of centralized servers, but rather by endpoints sending multicast streams to other endpoints. This provides flexibility in setting up meetings, in customizing meeting content, and in accommodating the adding or dropping of individual media streams without disruption of the remaining meeting contents.

Distributed conferencing systems operating in accordance with certain embodiments which include several loosely-coupled components, such as multicast sender, meeting microphones, slide presentation information, and so forth, as well as receivers. The senders send their content to a specific multicast IP address for a particular meeting, and the receivers are corresponding "tuned" to a specific multicast IP address to which one or more of the senders are configured to transmit for a particular meeting. For example, for a particular multicast IP address such as "www.x.y.z," content sources (senders) send packets to the multicast IP address. Conference participants (receivers) join or otherwise access the multicast IP address "www.x.y.z" and accordingly receive content designated to that address. In various contexts, content sources may also be receivers. Because the distribution of the IP packets is managed entirely by Internet (or other packet-based network) components, the conferencing can be managed independently from any centralized server for mixing the various multimedia components.

Remote participants access the meeting contents over the Internet. In certain embodiments, the meeting contents are presented to the remote participants using a computer-based system (e.g., one or more computer processors) operating a software application designed for receiving and presenting the meeting contents. In some implementations, the system controls the receipt of data streams via an IPv6 (or IPv4) multicast stream from the Internet or, if the participant's ISP does not support IPv6 or multicast, controls the receipt of data stream(s) as a unicast stream(s) through a multicast tunnel such as an AMT (automatic multicast tunnel), or through a server using a TURN protocol to convert multicast to unicast (TURN server). The system controls the mixing of multiple audio streams within the meeting contents so that the mixed audio can be played using the audio output of a receiving participant's computer. The system also controls the download and display of presentation slides or other documents, and can further display a current page (or other information) according to an RTP protocol as received over the multicast (e.g., IPv6) stream. Text streams included in the meeting contents are also displayed, for example as provided by a jabber room, as well as the names of the current speaker(s) or local audience questioner(s) as received on the RTCP packet over multicast.

In certain implementations, remote participants (receivers) access information about conference meetings via announcements provided on an Internet Media Guide, which contains human-readable content about the meeting such as date, time, duration, and description. The conference meeting information may also include machine readable content, such as the multicast IP address, port, codec, and so forth. Announcements may be implemented using any suitable protocol, such as Session Announcement Protocol (e.g., SAP-RFC 2974) which utilizes multicast to periodically broadcast announcements. A potential remote participant's system listens on a multicast IP address specified for announcements, and can read conference descriptions, select a meeting, and "tune in" to the multicast IP address, port, codec, etc., listed in the announcement for the selected meeting in a manner such as described above. As SAP is provided in a distributed manner, there need be no central point from which meetings are set up and announcements are sent.

In connection with another example embodiment, one or more of speakers, chairpersons, local audience participants, and so forth are identified using a badge that includes an RFID card programmed with name, title, function, employer, email address, or other types of identification information. In certain embodiments, one or more of the various microphones, such as the presenter's microphone, chair microphone, and audience microphones providing content to a meeting are equipped with RFID card readers that automatically read the information related to the person using the associated microphone. The identification information can then be provided in the meeting content data streams so that remote participants are able to see who is speaking.

In some embodiments, different multicast source units participating in a particular conference include independent units that are installed in a location (e.g., in a room) at which the conference is taking place. Each of the source units develops one or more data streams representing a portion of the meeting contents, and transmits the data stream(s) directly as an IPv6 multicast RTP stream. In this way, each of the source units of a conference room transmits independent and separately-decodable data streams, which permits the system to drop or add individual data streams without disrupting the broadcast of other data streams.

In some implementations, the source units further provide different streams for different types of content, such as audio and video content, and can transmit the streams to different IP addresses if appropriate. For example, different audio streams can also be provided from different locations to facilitate the generation of audio effects, such as surround-sound effects, at recipient devices.

In an example implementation, each of a plurality of source units develops one or more data streams from media content generated in response to a respective portion of the meeting contents, the portions of the meeting contents being apportioned based on the originator of the content. There may be a single source for a single participant at a particular source unit, or multiple sources involving one or more participants and/or other media content sources. For instance, a source unit may receive content from each conference room chair, a presenter, audience microphone stands and from scribes entering notes and comments via a jabber function. Other sources may include a presentation system or computer, such as a video screen or computer that provides documents, slides or video as part of the meeting. Each source unit collects media from one or more local content sources coupled thereto, and provides the collected media as streaming media to an IP address for the meeting. This content, together with content from any other source units, is accordingly provided to each recipient and, as such, may include one or more recipients as each source unit.

In certain embodiments, meeting source units are automatically configured in response to their respective access to, and utilization of, information in the same (or similar) multicast announcements provided to different receivers. For example, each source unit that generates and transmits meeting contents (e.g., a presenter microphone) accesses and receives all the announcements for all the conferences that are provided using a multicast announcement protocol. Each source unit parses and searches for its IP address inside each announcement. If an IP address match is found, then the source unit determines meeting information, such as the time and multicast IP address information necessary to transmit data streams, from the matching announcement. The source unit also discovers the codec, port, duration, and so forth from the announcement for a particular stream. The announcement for the receivers and the source units can be the same announcement or a different announcement.

To prepare an announcement for a particular meeting, the IP address of each source unit used for that meeting is inserted in the announcement along with other pertinent and descriptive information as may be necessary and/or useful for the meeting. In certain implementations, the prepared announcement is digitally signed as an added measure of security. Multicasting of meeting announcements in this manner can thus be used to help ensure that remote participants listen to authorized source IP addresses, and that the source units for each meeting will each start to send data streams at a proper time, to the right multicast IP address, and with a proper configuration.

According to another embodiment, each source unit is set up locally once the unit arrives at a conference room that is proper for a particular meeting. This can be accomplished in a number of different manners. For example, each source unit could receive data over a local transmission (wireless or otherwise). This local transmission would be such that it is only available to participants that are physically in the room. Examples include short-range wireless transmission or hardwired transmission (e.g., USB connection or a memory card). The local transmission could include a security code that allows the device to properly interface with the announcement (e.g., proper digital signature). In a particular implementation, a single source unit or computer provides the locally transmitted data. This can allow for a meeting organizer to authorize/confirm each source unit.

One such implementation may involve, for example, a meeting having several participants using laptop computers; each computer accesses the multicast IP address via its respective Internet connectivity. Each laptop computer thus acts as both a source of data (e.g., a built-in microphone and/or webcam) and a recipient of data (e.g., for presenting audio, video and/or documents/slides), and further can be used to identify the participant using the laptop.

In one implementation, each chair source unit has a microphone with an output that feeds directly into a computer (e.g., having a small form-factor) that is powered by Power-over-Ethernet (PoE) and sends RTP (Real-time Transport Protocol) over IPv6 multicast. The chair computer may also be connected to (and/or include) an RFID reader for identification of the individual(s) performing the meeting room chair function. For example, when a chairperson places an RFID card received during the conference registration process in front of the base of the chair microphone (where the RFID reader may be conveniently located), the RFID card is read and used in the conference. Using such an approach, the name, email address and/or other information about the chairperson contained on the RFID card may be sent in data packets (e.g., a RTCP SDES packet) as part of a conference data stream to identify the data stream(s) as originating from the chair source unit endpoint.

In keeping with this particular implementation, different source units or media sources for a conference may have similar features. For example, the source unit for a presentation speaker may include similar features as the chair source unit, with the following differences. Because the speaker is more mobile in the conference room than the chair, the speaker's unit is powered by battery, uses a lavalier microphone, and sends the multicast stream wirelessly, for example using Ethernet over Bluetooth or WiFi. The speaker source unit also communicates with a wireless device that the speaker uses to control the presentation slides. Such wireless device sends a redundant RTP stream over IPv6 multicast that contains the number of the current page.

Each audience microphone stand in the conference room also functions like the chair microphone, with variations as appropriate (e.g., the RFID reader may be larger in order to be able to directly read the RFID tag of the person standing in front of the microphone in accommodation of different body sizes and badge-wearing preferences). Using RFID readers for audience microphones facilitates the identification of audience members, rather than relying on the audience member to state their name and affiliation, and further permits desirable identification such as by displaying a participant's name in a conference when that participant is speaking and/or when video capturing the participant's image is displayed. Similarly, conference room scribes may use computers running software that receive user inputs for meeting-related notes or comments, which can be transmitted using, for example, Text Over IP on an IPv6 multicast stream.

The RFID tag is also used in a distributed manner. Rather than storing an identifier in each RFID tag that is used to match a name in a database, certain embodiments of the present invention utilize RFID tags that contain the name, email address, or other information identifying the local participant. In this way, each microphone's RFID reader can directly read the local participant's information and annotate the multicast stream with the information.

Other embodiments are directed to a touch screen or touch pad device via which inputs are provided as part of a multicast meeting (e.g., with the device acting as a source) or as a recipient device for displaying meeting content. For instance, a hand-held mobile device having a touch screen input can be used as a source unit to gather audio, image and/or video data to provide as content for the meeting. Such a hand-held device can also be used as a receiving device to present meeting contents (e.g., audio and video) to an end recipient.

In certain embodiments, source unit participation is actively controlled in response to user inputs. For instance, a chair person may control the authorization of source units that are to provide data streams to a multicast IP address for a particular conference. This allows customized meeting contents to be broadcast to the remote participants, and may also provide a way to ensure that only content from official sources are provided in the multicast. For example, multicast protocol generally supports the ability of anybody with access to send data to the multicast group, and as such any remote participant may be able to send (unofficial) data that becomes part of the multicast broadcast of the meeting contents. The ability to identify only authorized sources as part of the multicast transmission may be used to prevent such intrusions. Authorization control can also be used to prioritize participants, such as by giving priority to main speakers or paying participants, relative to guests. Similarly, participants may be limited in their access as a receive-only connection, without the ability to add content to the meeting.

In other embodiments, participation is handled on a relatively open scale. For instance, when remote participants are limited in number or limited to pre-identified participants (perhaps with aid of encrypted access), participation by all remote participants can be allowed and/or even encouraged. The system may also permit remote participants to choose to participate with each other. For instance, two colleagues located remotely from one another may subscribe to streams from one another. These participants can use their own source units or software-configured home computer to generate media streams.

When other media content such as audio, video, images or documents are to be part of a conference, the respective streams are sent using an approach such as RTP (real-time transport protocol). When available, RFID information is sent using the control protocol for RTP, named RTCP. This protocol can carry personal (name and email) information, and associate audio/video streams with the personal information as belonging to the same source. In certain implementations, information such as physical location of the various source units in the conference room may also be associated with the audio/video streams, for example to provide a 3D audio representation of the conference, allowing remote participants to experience the meeting contents as if listening in the middle of the conference room.

The identification information is used in a variety of other manners, in accordance with various example embodiments. For example, video streams may include video captured by several video cameras. Rather than transmitting all of the shots at once, a video camera shot that captures a currently active speaker(s) can be transmitted or otherwise presented. Control for this selective presentation may, for example, be effected at a source unit receiving two or more sets of media data (e.g., a source coupled to several microphones and cameras), or at a receiver that receives all streams and presents one or more based upon configuration, such as may be set by a particular user. These approaches can be particularly useful where participants move within a conference area and are thereby associated with different source units, depending upon their current location. Other options include, showing a static image of the current speaker, such as a pre-submitted photograph or a snap shot taken in response to detecting audio from a speaker.

In one implementation, a receiver computer at a remote participants' location generates a small pop-up type of indicator that identifies current speakers, and may also include related data such as photographs, video images, and textual information. In a similar manner, other inputs from speakers, such as text or other data, can also be presented in such pop-ups. The remote participants can be allowed to view several image areas in addition to a main image. Thus, there may be a video presentation (e.g., slides) that takes up a portion of the display, and other portions of the display (overlaid, tiled or otherwise arranged on the screen) can show data from one or more of the source units. Thus, the system permits a participant associated with a source unit to provide textual input for viewing without interrupting audio from the current speaker. Additionally, remote participant receiver computers can permit users to adjust the media presentation from any particular source. For example, individual volume control, muting, or minimization of video display can be controlled for each source unit and/or the respective data streamed therefrom.

In certain embodiments, the conference room also includes a computer configured for logging into a multicast session and running an instance of remote participant software (as a receiver computer) as discussed above. With the audio output of the computer connected to an external amplification system in the conference room and the video output of the computer connected to a video display device (e.g., a projector), the local audience can see and hear the conference as it is being presented to the remote participants.

In some applications, meetings are recorded for playback at a later time using, for example, a server to listen in on the multicast in a manner that is similar to any other remote participant. The server effectively acts like such a participant and, where appropriate, runs participant software as discussed herein. As such, such a recording-participant server can be located anywhere on the packet-based network (e.g., Internet). The meeting presentation is saved so that users can connect to a web site and follow the presentation, such as by using unicast.

The various embodiments as discussed herein may be implemented using a variety of structures and related operations/functions, which may involve a variety of hardware and software solutions. As generally discussed herein, an application can represent software stored on a storage medium. When the software is executed by a processing circuit, such as a micro-processor, one or more functions of the invention are carried out or facilitated. Some applications can be implemented as a logic circuit, such as by transferring functional software code to a programmable logic array. In another instance, an integrated logic circuit is designed to carry out one or more functions. Similarly, one or more embodiments as described herein may be computer-implemented or computer-assisted, as by being coded as software within a coding system as memory-based codes or instructions executed by a computer processor, microprocessor, PC or mainframe computer. References to the term software may therefore be implemented in these manners. Such computer-based applications are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, implemented using electronic circuits such as digital or analog circuits. In addition, various embodiments may be implemented using a tangible storage medium that stores instructions that, when executed by a processor, performs one or more of the steps, methods or processes described herein. These applications and embodiments may also be used in combination; for instance certain functions can be implemented using discrete logic (e.g., a digital circuit) that generates an output that is provided as an input to a processor.

Turning now to the figures, various embodiments are shown and may be implemented in connection with one or more embodiments as discussed above and/or as presented in the claims. Beginning with FIG. 1, a distributed conferencing system 100 provides local meeting contents in connection with another example embodiment. Contents are generated within a conference room 110, and sent to remote participants (User 1 through User N) via multicast broadcasting. In a generalized conference room environment, the meeting content to be provided to remote participants may originate from one source or many sources, for example an audio feed of a presenter along with presentation slides and optionally a video feed of the presenter, an audience microphone for question and answer sessions, an audio feed from a meeting chair, a text feed including notes and comments generated concurrently with the presentation, and so forth.

Figure 1:
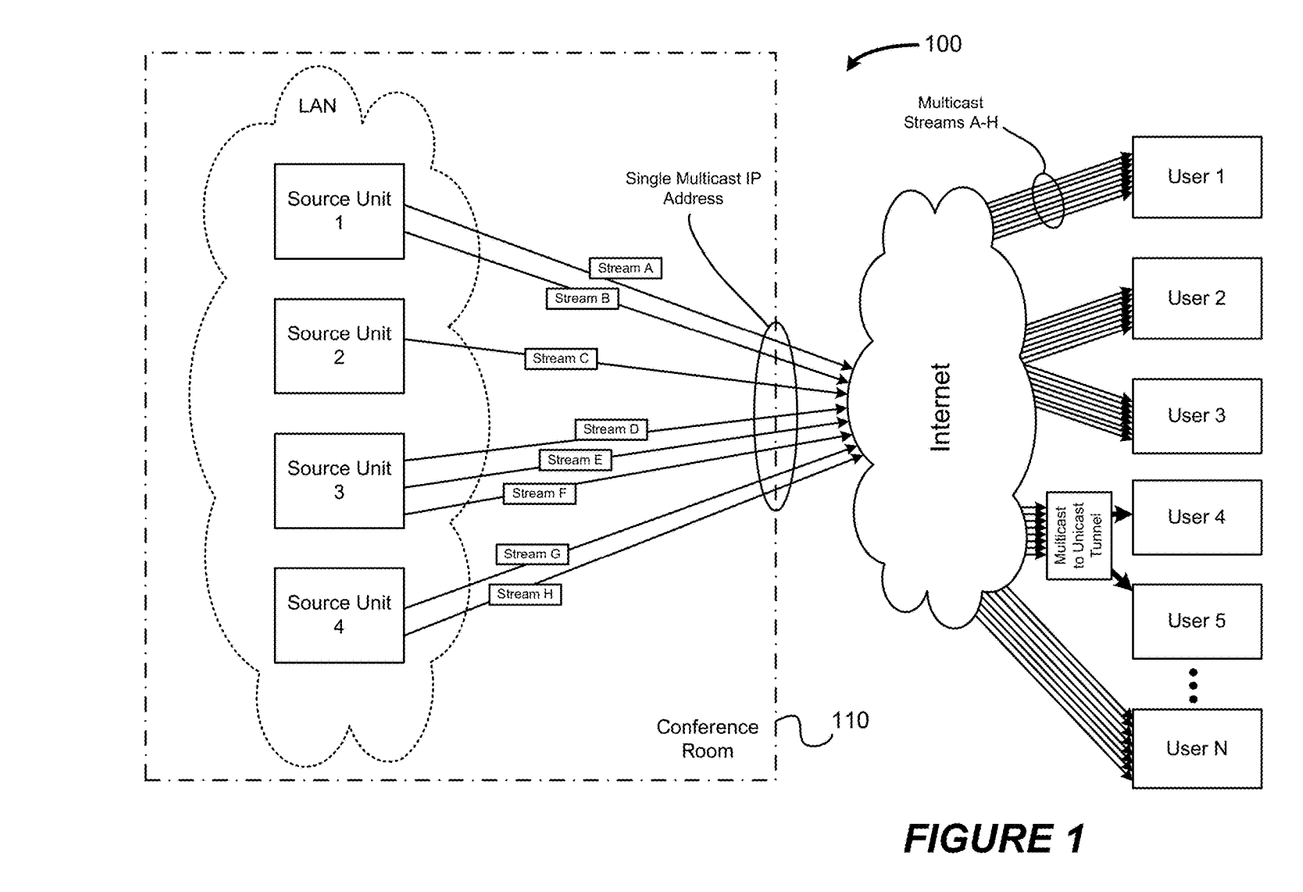
FIG. 1 shows a conferencing system in accordance with certain example embodiments of the present invention.

FIG. 1 shows (by way of example) four source units, each of which develops one or more data streams representative of generated media content associated with a portion of meeting contents for a particular meeting. For example, Source Unit 1 may receive audio output from a chair microphone along with information from an RFID card reader that identifies the chair to develop two data streams, Stream A and Stream B. Similarly, Source Unit 1 may generate separate audio and video streams to respectively provide Stream A and Stream B. Each of the developed data streams A-H are multicast via the same multicast IP address, as conceptually indicated in FIG. 1, for example using IPv6 multicast protocols.

Remote participants, for example User 1 through User N, can receive the multicast broadcast of data streams from conference room 110 using the multicast IP address specified for the meeting. For presentation of the data streams, each remote participant's computer runs an instance of a software program that mixes the audio streams into a single audio output, displays any presentation slides, and displays any textual information. An example of such a program is "Zap" available from (see, e.g., http://www.croczilla.com/zap), which is an open-source multimedia communication platform. Other example programs include media player-type programs, such as the VLC media player available from VideoLAN (www.videolan.org), which can be used to listen to the audio from a presentation. Where such programs do not support IPv6 (or IPv4) multicasting, access is provided through a multicast-to-unicast tunnel, such as a TURN server. The tunnel receives multicast broadcast streams and provides the received multicast streams as a unicast stream to remote participants who subscribe to and log into the server. When providing for receipt of the multicast streams at a server for unicast distribution, the meeting contents as provided to the remote participants can be recorded for later download or playback by users logged on to the server.

Figure 2:
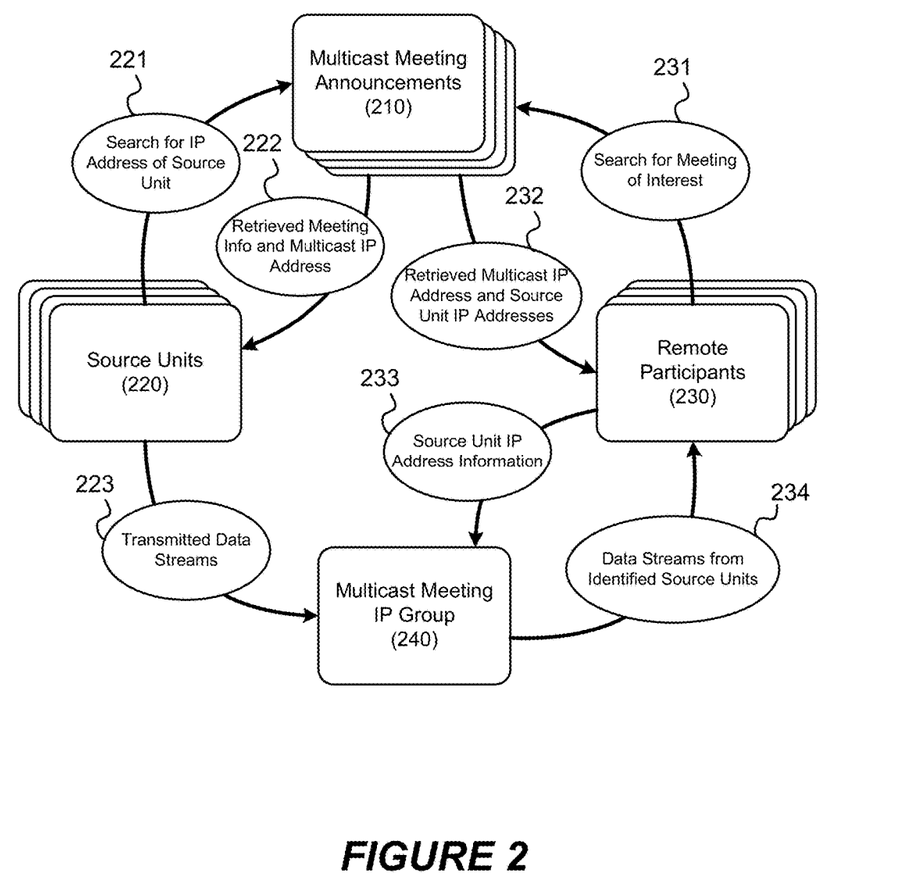
FIG. 2 shows a system-based flow diagram illustrating a system and related steps involved with multicast meetings, in accordance with other example embodiments of the present invention.

FIG. 2 illustrates a system and approach for distributed meeting and distributing meeting contents, in accordance with certain embodiments. Prior to the specified date and time for a meeting, a meeting announcement 210 is created and broadcast to a meeting announcement multicast IP address, for example using a SAP protocol. The meeting announcement 210 includes human-readable information (or information that can be presented in human-readable form), such as a title and description for the meeting, the meeting date, time and duration, and so forth. The meeting announcement 210 further includes machine readable information about the meeting, including the multicast group IP address for the meeting, as well as the IP addresses of the source units providing the meeting content data streams. This information may be used on both sender (source unit 220) and receiver (remote participant 230) side components, as discussed herein. In certain embodiments, all the meeting announcements 210 for meetings to be distributed in accordance with the present invention are searchable and retrievable from the same multicast IP address.

A remote participant 230 accesses and initiates a search 231 of the meeting announcements 210 for one or more particular meetings that the remote participant 230 wishes to attend. Upon selection of a meeting, the remote participant 230 receives the multicast group IP address 232 for the selected meeting, and which also, in certain instances, includes the IP addresses for the source units that will be developing and transmitting the data streams representing the meeting contents. In embodiments where the remote participant 230 receives the source unit IP addresses, the source unit IP addresses are supplied by the remote participant 230 to the multicast group IP address for the meeting as a way of requesting which data streams to receive. As such, even if unauthorized sources (such as other remote participants) try to transmit information to the multicast group IP address for the meeting, the remote participant 230 will only receive the data streams from the specified source units.

The authorized meeting content source units may be altered or updated at any time. For example, a remote participant may place a request (for example via email or chat room) to be added to the authorized sources in order to ask a question or provide a comment, much like a live audience member.

On the sender side, each of the source units 220 for a meeting develop and transmit data streams 223 representing a portion of the meeting contents to the same multicast group IP address at block 240 as specified for the meeting. In certain embodiments, the contents of the meeting announcements 210 may be used to automatically configure the source units 220 for the meeting. For example, when activated each source unit 220 initiates search criteria 221 for searching the various meeting announcements 210 for instances of that source unit's IP address. When the source unit's IP address is found in a meeting announcement, the meeting information 222 is retrieved by the source unit 220. The meeting information includes the multicast group IP address for the meeting, as well as information relating to the meeting date, time and duration, in addition to the IP addresses of the authorized source units. As such, each source unit 220 is correctly configured to develop and transmit data streams to the correct multicast group 240 at the correct times.

Figure 3:
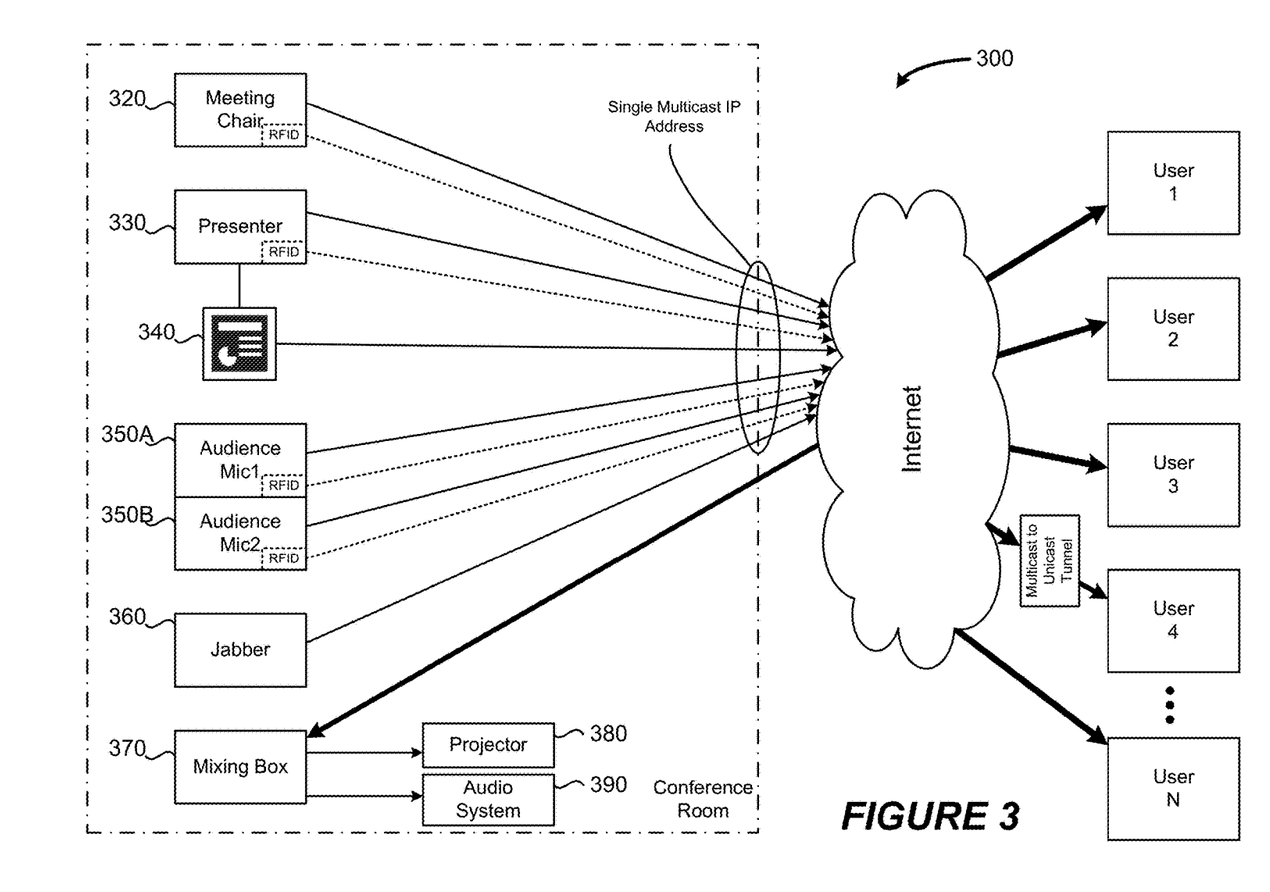
FIG. 3 shows a conferencing system, in accordance with certain example embodiments of the present invention.

FIG. 3 schematically shows an example arrangement of source units for a distributed conferencing system 300. In this arrangement, the source units include a meeting chair unit 320, a presenter unit 330, a slide presentation unit 340, audience microphone units 350A and 350B, and a jabber unit 360. Each of the meeting chair unit 320, presenter unit 330, and audience microphone units 350A and 350B include microphones that produce audio content for the meeting. In addition, each of these units may also include an RFID card reader that reads the name, email address, or other information identifying the person speaking at the associated microphone so that the remote participant is provided this information as part of the multicast.

In embodiments utilizing RFID identification, each local participant to the meeting receives an RFID card as part of the registration process. An exemplary RFID card that can be used in connection with these and other embodiments is an ISO 15693 clamshell card with enough memory to store the name and email address of the meeting participant. The RFID card can be used as a regular badge on one side (e.g., including printed name and affiliation) and can include additional information, such as support advertisement, on the other side. A 13.56 MHz frequency RFID is used to permit the RFID card to be used as storage, provide for a communication protocol that detects collision so that multiple cards can be in the vicinity of a detector at the same time, and allow a card to be read as far away as 11 inches to accommodate different heights and badge-wearing preferences.

Referring again to FIG. 3, in an example embodiment, the chair source unit 320 includes a conference-type microphone, the base of which includes an RFID card reader, and a small computer powered over an Ethernet cable. The computer reads the RFID card, samples audio coming from the microphone and sends RTCP and RTP packets to the multicast group of the room over the Ethernet cable. An exemplary chair microphone may be built from the following parts: a Linksys 12 Volt Power Over Ethernet Adapter Kit, an EPIA-PX5000G Pico ITX Mainboard as available from E-itx of Fremont, Calif., an APSX RW-210 RFID Reader, and a unidirectional gooseneck microphone. There may be multiple chair microphones per conference room, and in some instances, three or fewer. Multiple chair microphones may be used to accommodate panel discussions and moderated debates.

In an example embodiment, the presenter source unit 330 uses a wireless microphone setup, for example implementing a modified cell phone that receives audio from a lavalier microphone clipped to the presenter and sends RTP over a Wi-Fi interface. An RFID reader is attached over a USB connector and a USB/RS-232 converter to provide the presenter's ID and email. The cell phone is also equipped with a cordless control unit used to change the pages of the presentation. An exemplary presenter microphone is built from the following parts: an APSX RW-210 RFID Reader with a C-100 Converter, an Openmoko Freerunner, a USB/RS232 converter, a lavalier microphone, and a cordless "presenter" slide control unit. Generally, one wireless microphone is used for each conference room.

In an example embodiment, slide presentation unit 340 provides user interaction functions via a computer having an input device such as a small touch screen. A presenter can use the input device to control slides or other video functions such as zooming, moving and drawing functions. The input device commands used to change the slides, or otherwise modify their presentation, are also sent as a data stream in the multicast so that the right slide is displayed at the right time for remote participants. Rather than transmitting real-time video, the slide presentation for the conference meeting may be handled by transmitting a URL for the presentation along with the current slide number. Each receiver uses the URL to download the presentation, and uses the page number embedded in the video stream to select the current page.

In an example embodiment, the audience microphone units 350A and 350B are unidirectional microphones mounted on a stand. A large RFID reader is installed directly on the stand, roughly at the same height as an RFID badge worn by an audience member when standing at the microphone to talk. An exemplary audience microphone is built from the following parts: a Linksys 12 Volt Power Over Ethernet Adapter Kit, an EPIA-PX5000G Pico ITX Mainboard, an APSX RW-310 RFID Reader, a unidirectional condenser microphone, and a microphone stand. One or two stand microphones can be used in each conference room.

Referring again to FIG. 3 and in connection with certain embodiments, a mixing box 370 is used in a manner similar to interaction with a remote participant to receive the conference meeting contents from the multicast IP address. The content received at the mixing box 370 is mixed using an instance of a program such as Zap (mentioned above), or another suitable program used by the remote participants, and displayed in the conference room on a projector unit 380 and via the conference room's audio amplification system 390. In this way, the local participants are able to experience what the remote participants are seeing and hearing.

Figure 4:
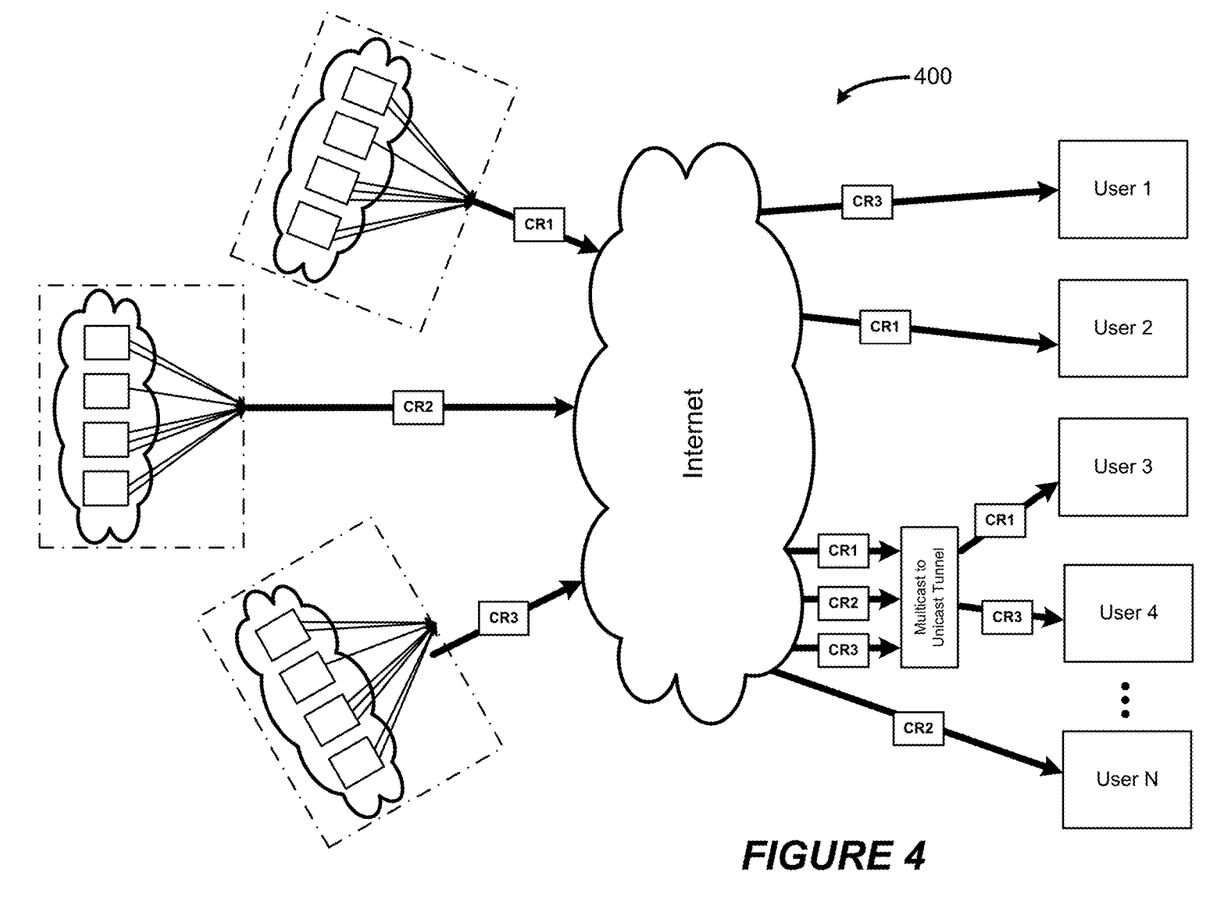
FIG. 4 shows a system for providing multiple sets of conference meeting contents for selection and receipt by remote participants, in accordance with other example embodiments of the present invention.

FIG. 4 schematically shows a distributed conferencing system 400 that provides meeting contents from multiple different conference rooms CR1-CR3. The meeting contents for each of the conference rooms are associated with, and transmitted to, a different multicast group IP address. The conference room contents are selectable by remote participants, such as Users 1-N, by selecting to receive contents from the associated multicast IP address, for example based on the meeting announcement protocols discussed above. Alternatively, a remote participant without multicast capabilities can access the meeting contents in real time by logging onto a multicast-to-unicast tunnel, which converts the multicast streams into a unicast stream, as indicated.

Figure 5:
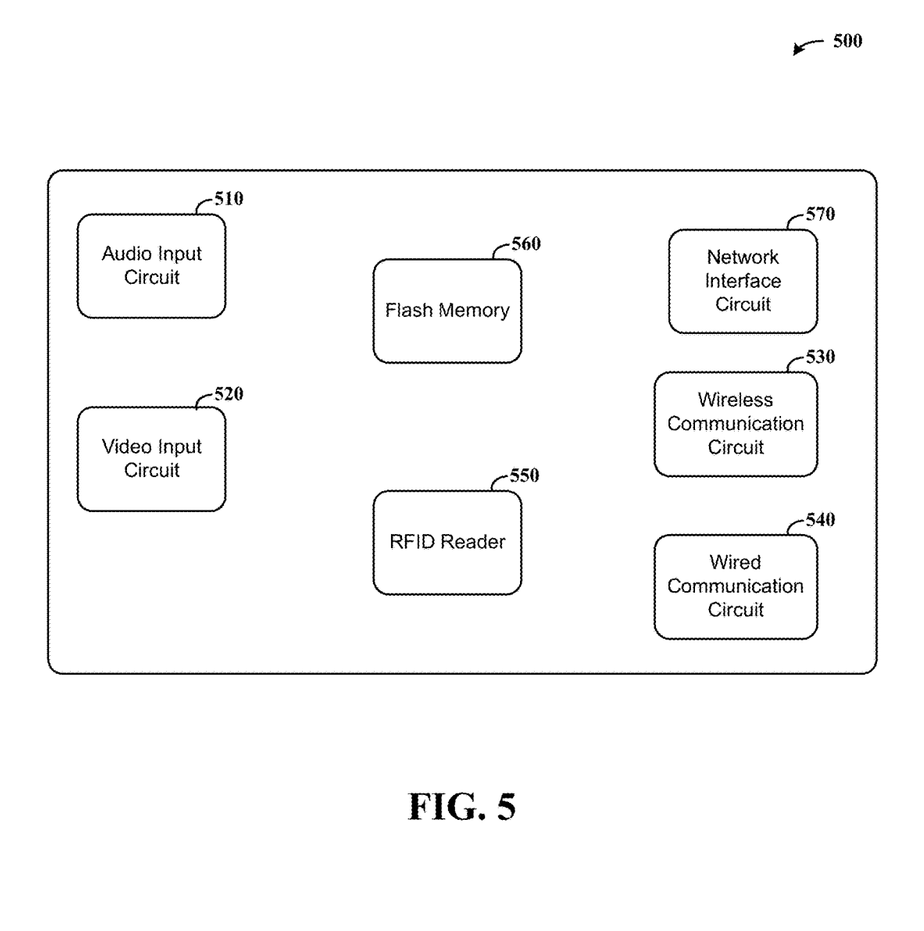
FIG. 5 shows a multicast IP source device, in accordance with another example embodiment of the present invention.

FIG. 5 shows a multicast IP source device 500, in accordance with another example embodiment of the present invention. The source device 500 may, for example, be coupled to one or more input devices such as an audio or video capture device, or may include such devices internally. For example, the source device 500 may be a mobile hand-held device having input devices such as a microphone and/or camera, and communicate information captured via the input devices to a multicast IP address as discussed above, via one or more network connections. Accordingly, the representations in FIG. 5 show various functionalities of the device 500, some or all of which may be implemented in connection with various example embodiments.

By way of example, the multicast IP source device 500 includes an audio input circuit 510 and a video input circuit 520. In some applications, these respective circuits 510 and 520 receive audio and video data captured by an external device such as a microphone or camera, coupled to the device 500 via the respective inputs, or via another communications circuit to which the input circuits are connected. Such communications circuits are represented by wireless communication circuit 530 (e.g., Wi-Fi and/or Bluetooth), and wired communication circuit 540 (e.g., a USB port or Ethernet connection). In other applications, these respective circuits 510 and 520 include capture devices, such as a microphone and camera. The device 500 may further include an RFID reader circuit 550, which reads RFID information from a user at the device in a manner as described herein. Captured data may be stored in local memory, such as flash memory 560.

The multicast IP source device 500 also includes a network interface circuit 570 that is connected to a network access point for communicating over the Internet. For example, the network interface circuit 570 may include a Wi-Fi circuit configured to communicate with a local router via 802.xx wireless standards, or a wired Ethernet circuit configured to communicate over an Ethernet network. In other implementations, the network interface circuit 570 is a mobile device communications circuit, such as for communicating to a mobile telephone station using cellular or other types of mobile technology (e.g., 2G, 3G, 4G or advanced iterations of mobile telecommunications standards).

One or more iterations of the device 500 may be implemented in connection with one or more example embodiments described herein. For example, Source Unit 1 of FIG. 1, or source unit 220 of FIG. 2 may include the source device 500. Similarly, the device 500 may also act as a recipient device such as represented by User 1 in FIG. 1, or remote participant 230 of FIG. 2. The device 500 may similarly be implemented with the systems and approaches shown in and described in connection with one or both of FIGS. 4 and 5.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. A method comprising:
   providing access to a distributed conferencing system that provides local meeting contents to remote participants from a plurality of circuit-based source units, each including logic circuitry configured to process communication data, using a meeting multicast group IP address; and
   causing the logic circuitry to perform the steps of:
      in response to generating media content responsive to and representative of respective portions of the meeting contents, identifying an IP address associated with a source unit in a corresponding announcement for a meeting to be using the generated media content, automatically configuring one of the source units and developing at least one data stream as a separately decodable real-time representation of at least a portion of the media content;
      transmitting the at least one data stream to the meeting multicast group IP address; and
      configuring the logic circuitry of at least two source units to transmit to a common meeting multicast group IP address after configuration data is received from another data source, and connecting to the meeting multicast group IP address to communicate via the meeting multicast group IP address.

2. The method of claim 1, further including, in the logic circuitry at one of the source units,
   accessing an announcement that includes a list of authorized data streams;
   subscribing to the meeting multicast group IP address to receive a plurality of the data streams;
   displaying the media content in response to the list of authorized data streams; and
   providing an interface that allows for individual control of multiple ones of the data streams.

3. The method of claim 1, further including, in the logic circuitry at one of the source units, accessing an announcement that includes a list of authorized data streams.

4. The method of claim 1, further including, in the logic circuitry at one of the source units, subscribing to the meeting multicast group IP address to receive a plurality of the data streams.

5. The method of claim 1, further including, in the logic circuitry at one of the source units, displaying the media content in response to the list of authorized data streams.

6. The method of claim 1, further including, in the logic circuitry at one of the source units,
   accessing an announcement that includes a list of authorized data streams; and
   providing an interface that allows for individual control of multiple ones of the data streams.

7. The method of claim 1, further including using the other data source as a system controller.

8. The method of claim 1, wherein transmitting the at least one data stream includes transmitting identification information in the at least one data stream, the identification information indicating an identity of participants using the source unit.

9. The method of claim 1, further including receiving the identification information from a wireless card.

10. The method of claim 1, wherein transmitting the at least one data stream includes transmitting identification information in the at least one data stream, the identification information indicating an identity of participants using the source unit; and
    wherein transmitting further includes receiving the identification information from a wireless card.

11. The method of claim 1,
    further including, in the logic circuitry at one of the source units, performing the step of receiving configuration information from an announcement multicast IP address, and
    wherein transmitting includes an act of using the configuration information to identify the meeting multicast group IP address.

12. The method of claim 1, further including mixing the streams and presenting the media content to participants of the local meeting.

13. The method of claim 1, wherein the announcement includes an IP address of each respective source unit that is to be used for the meeting and additional information pertinent to the meeting and wherein the announcement is digitally signed as a measure of security.

14. The method of claim 1, wherein an IP address of each respective source unit that is to be used for the meeting, and additional information pertinent to the meeting, are inserted into the announcement.

15. The method of claim 1, wherein the announcement includes an IP address of each respective source unit that is to be used for the meeting and additional information pertinent to the meeting and wherein the announcement is digitally signed as a measure of security; and
    further including inserting an IP address of each respective source unit that is to be used for the meeting, and additional information pertinent to the meeting, into the announcement.

16. The method of claim 1, wherein the announcement is digitally signed as a measure of security.

17. The method of claim 1, further including, in the logic circuitry at one of the source units, determining a type of access for each remote participant using the announcement.

18. The method of claim 1, further including, in the logic circuitry at one of the source units, determining a selected language for each remote participant using the announcement.

19. The method of claim 1, further including, in the logic circuitry at one of the source units, tailoring content for the remote participants based on a participant's end device and using the announcement.

20. The method of claim 1, further including, in the logic circuitry at one of the source units, defining sharing capabilities of the remote participants using the announcement.

* * * * *